(12) United States Patent
Kamio (10) Patent No.: US 12,391,099 B2
(45) Date of Patent: Aug. 19, 2025

(54) WIND DIRECTION ADJUSTING APPARATUS

(71) Applicant: NIHON PLAST CO., LTD., Fujinomiya (JP)

(72) Inventor: Kenichi Kamio, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 317 days.

(21) Appl. No.: 18/100,586

(22) Filed: Jan. 24, 2023

(65) Prior Publication Data

US 2023/0234426 A1 Jul. 27, 2023

(30) Foreign Application Priority Data

Jan. 27, 2022 (JP) ................................ 2022-011068

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC ...................... B60H 1/3421; B60H 2001/3471
USPC ........................................................ 454/155
See application file for complete search history.

(56) References Cited

U.S. PATENT DOCUMENTS

| 9,555,685 | B2* | 1/2017 | Mercey | B60H 1/3421 |
| 9,764,622 | B2* | 9/2017 | Noichl | B60H 1/3421 |
| 2009/0286462 | A1* | 11/2009 | Goto | B60H 1/3428 |
| | | | | 454/155 |
| 2016/0303942 | A1 | 10/2016 | Lim | |
| 2023/0008640 | A1* | 1/2023 | Park | B60H 1/0065 |
| 2023/0025043 | A1* | 1/2023 | Yang | B60H 1/0065 |

FOREIGN PATENT DOCUMENTS

JP 2016-539840 12/2016

* cited by examiner

*Primary Examiner* — Avinash A Savani
*Assistant Examiner* — Dana K Tighe
(74) *Attorney, Agent, or Firm* — Amin, Turocy & Watson, LLP (57) ABSTRACT

A wind direction adjusting apparatus of the present invention includes: a case body; at least one guide louver; and an operation knob slidably attached to the guide louver, in which the operation knob includes a knob body portion provided with an insertion portion through which the guide louver is inserted, and a friction member that is held in the knob body portion in a state of being in contact with an outer peripheral surface of the guide louver, the friction member has elasticity and has at least one compression portion including a portion that is compressed by being pressed against the guide louver, and the compression portion has a shape in which a dimension of the compression portion along a sliding direction of the operation knob gradually decreases in a pressing direction against the guide louver.

7 Claims, 4 Drawing Sheets

WIND DIRECTION ADJUSTING APPARATUS

CROSS REFERENCE TO RELATED APPLICATIONS

The disclosure of Japanese Patent Application No. 2022-011068 filed on Jan. 27, 2022 including the specification, drawings and abstract is incorporated herein by reference in its entirety.

TECHNICAL FIELD

The present invention relates to a wind direction adjusting apparatus having a guide louver to which an operation knob is slidably attached.

BACKGROUND ART

For example, Japanese Translation of a PCT Application Laid-Open No. 2016-539840 (PTL 1) discloses a structure for attaching an operation knob to a guide louver that guides an air discharge direction from a vent. In addition, in PTL 1, the guide louver and the operation knob are called a vane and a wing knob, respectively.

In PTL 1, the operation knob has an upper knob and a lower knob assembled together, and a rubber member and a decoration member disposed between the upper knob and the lower knob. The rubber member is formed of a soft rubber material, and is held by the lower knob to come into contact with an end surface of the guide louver inside the operation knob. PTL 1 describes that by providing the rubber member, the feeling when operating the operation knob is improved and friction noise is reduced.

CITATION LIST

Patent Literature

PTL 1
Japanese Translation of a PCT Application Laid-Open No. 2016-539840

SUMMARY OF INVENTION

Technical Problem

In PTL 1, in a case where the operation knob (wing knob) is slid along the guide louver (vane) in order to change the air discharge direction, the rubber member provided in the operation knob slides on the continuous end surface of the guide louver while continuously coming into contact with the continuous end surface. In addition, in the operation knob of PTL 1, a contact surface (abutting surface) of the rubber member that is brought into contact with the end surface of the guide louver is formed as a flat surface.

In this case, when the flat contact surface of the rubber member slides while coming into contact with the end surface of the guide louver, due to an effect of a frictional force (static friction force and kinetic friction force) between the contact surface of the rubber member and the end surface of the guide louver, a stick-slip phenomenon occurs in which sticking (stick) and sliding (slip) between two contacting surfaces alternately occur repeatedly.

When this stick-slip phenomenon occurs in a case where the operation knob is operated, the sliding operation of the operation knob becomes unstable, and the operation knob cannot be moved smoothly. As a result, deterioration of the feeling (operation feeling) when operating the operation knob, or deterioration of operability such as ease of operation is incurred.

The present invention has been made in view of the problems in the related art described above, and an object thereof is to provide a wind direction adjusting apparatus capable of preventing or suppressing an occurrence of a stick-slip phenomenon in a case where an operation knob is operated.

Solution to Problem

In order to achieve the above object, a wind direction adjusting apparatus provided by the present invention includes: a case body in which air flows; at least one guide louver that is provided in the case body and guides a flow of the air; and an operation knob slidably attached to the guide louver, in which the operation knob includes a knob body portion provided with an insertion portion through which the guide louver is inserted, and a friction member that is held in the knob body portion in a state of being in contact with an outer peripheral surface of the guide louver to generate a frictional force with the guide louver, the friction member has elasticity and has at least one compression portion including a portion that is compressed by being pressed against the guide louver, and the compression portion has a shape in which a dimension of the compression portion along a sliding direction of the operation knob gradually decreases in a pressing direction against the guide louver.

In the wind direction adjusting apparatus according to the present invention, it is preferable that a tip end portion of the compression portion in the pressing direction against the guide louver has a pointed shape that gradually decreases in dimension along the sliding direction.

In addition, it is preferable that the friction member has an attached portion attached to the knob body portion and at least one protruding portion protruding from the attached portion toward the guide louver, and the compression portion is provided in the protruding portion.

Furthermore, it is preferable that the compression portion has, in the sliding direction, an overlap portion that overlaps the guide louver in a thickness direction of the guide louver and a non-overlap portion that does not overlap the guide louver in the thickness direction of the guide louver.

Advantageous Effects of Invention

According to the wind direction adjusting apparatus of the present invention, it is possible to prevent or suppress a stick-slip phenomenon in a case where the operation knob is operated.

DESCRIPTION OF EMBODIMENTS

Hereinafter, preferred embodiments of the present invention will be described with reference to the drawings with embodiments.

Figure 1:
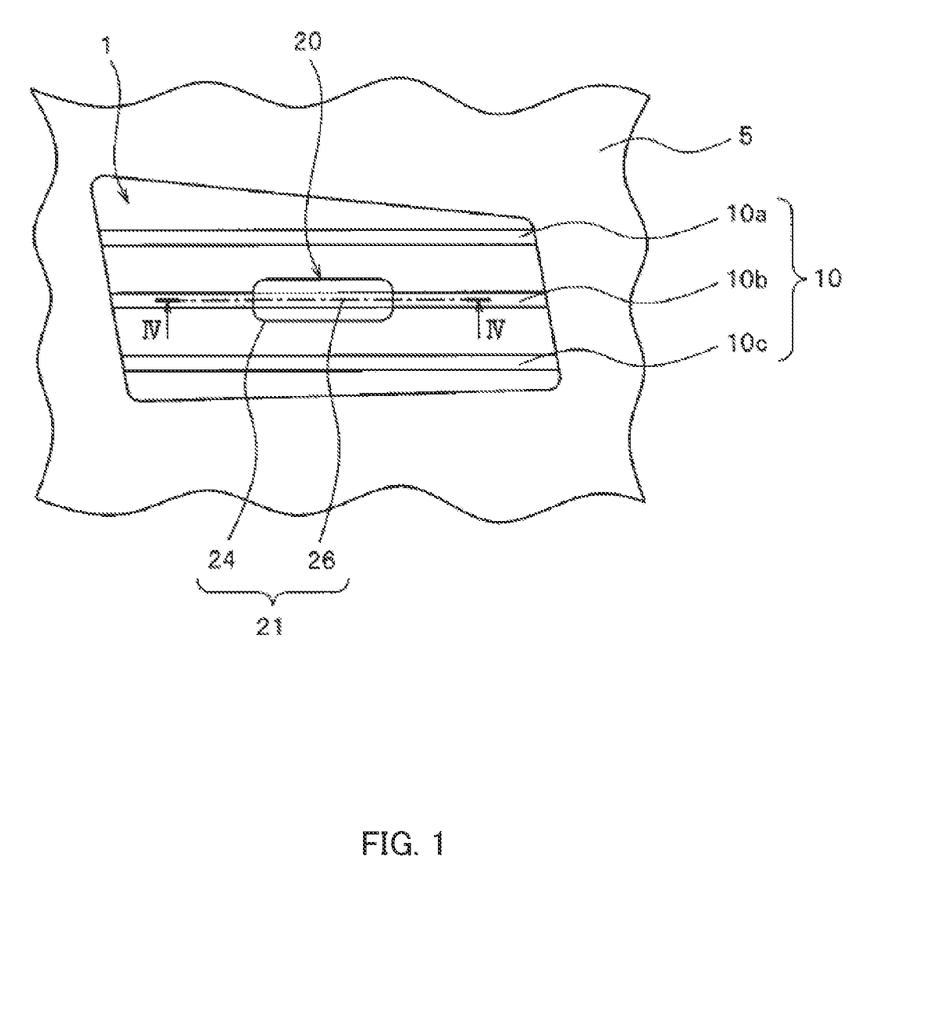
FIG. 1 is a perspective view schematically showing a wind direction adjusting apparatus according to an embodiment of the present invention from an air outlet side.
Figure 2:
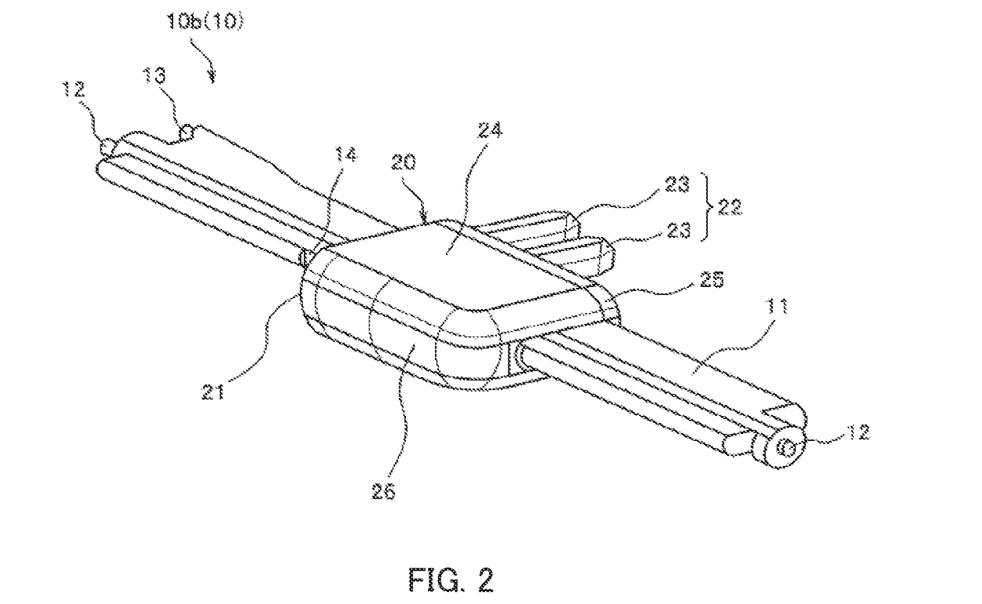
FIG. 2 is a perspective view schematically showing one guide louver (horizontal louver) disposed in the wind direction adjusting apparatus shown in FIG. 1.
Figure 3:
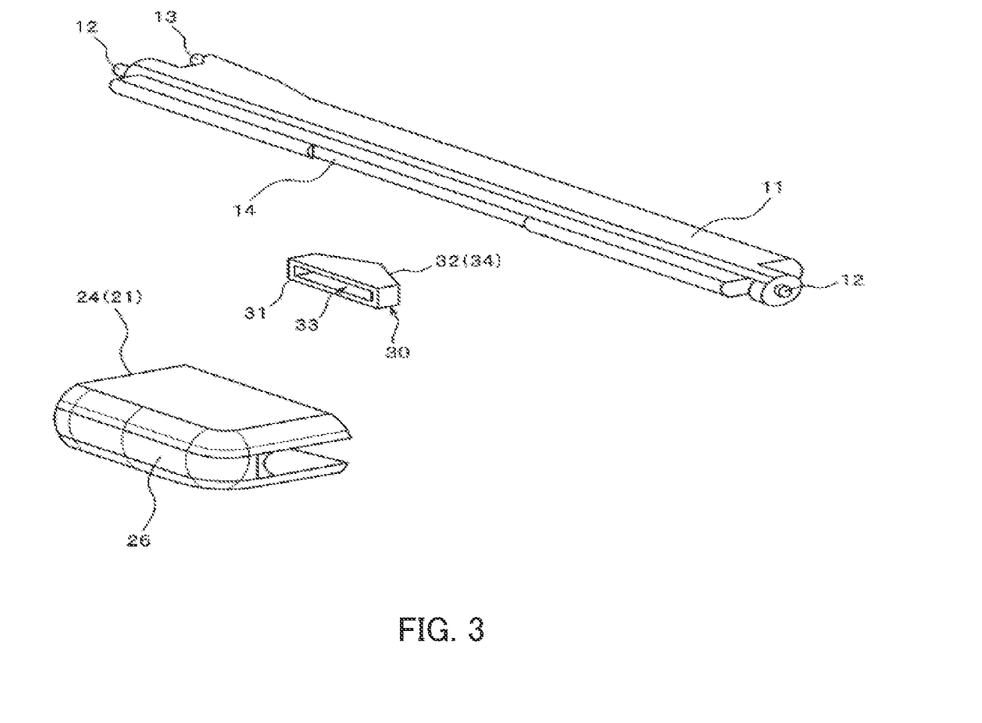
FIG. 3 is a perspective view schematically showing a partially exploded state of the guide louver shown in FIG. 2.
Figure 4:
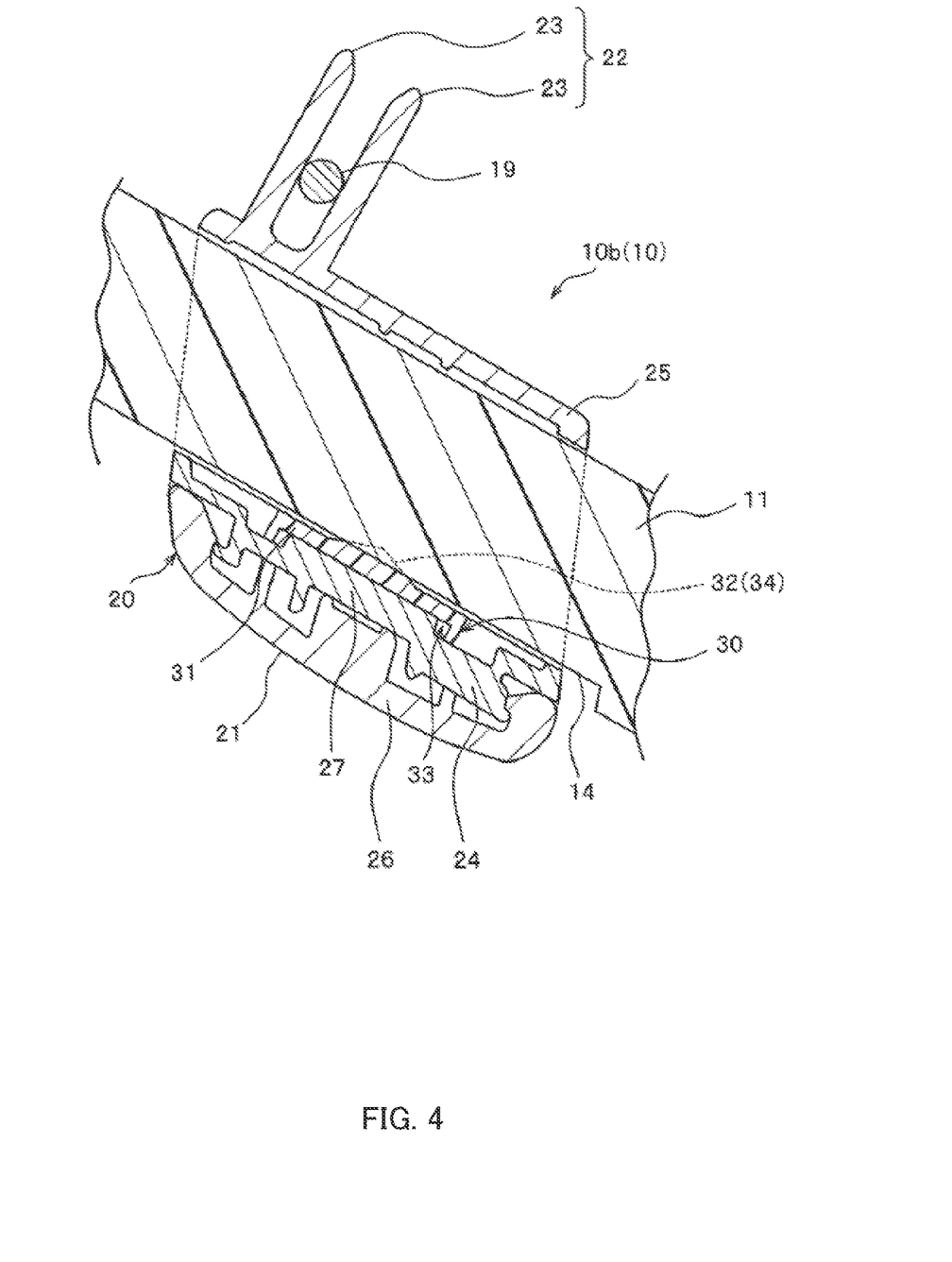
FIG. 4 is a cross-sectional view schematically showing a cross section of the wind direction adjusting apparatus shown in FIG. 1 taken along line IV-IV.

FIG. 1 is a perspective view schematically showing a wind direction adjusting apparatus according to the present embodiment from an air outlet side. FIG. 2 is a perspective view schematically showing one guide louver (horizontal louver) disposed in the wind direction adjusting apparatus, and FIG. 3 is a perspective view schematically showing a partially exploded state of the guide louver shown in FIG. 2. FIG. 4 is a cross-sectional view schematically showing a cross section of the wind direction adjusting apparatus shown in FIG. 1 taken along line IV-IV.

Wind direction adjusting apparatus 1 of the present embodiment shown in FIG. 1 is installed in an interior member such as an instrument panel or a center console disposed in a vehicle interior of a vehicle. Specifically, wind direction adjusting apparatus 1 of the present embodiment is installed at a side edge portion near an outer side of instrument panel 5 in a width direction thereof. Wind direction adjusting apparatus 1 is connected to an air conditioning apparatus (not shown) or the like provided in the vehicle to enable air supplied from the air conditioning apparatus to be blown to the vehicle interior via an air outlet (opening) of wind direction adjusting apparatus 1.

Here, regarding wind direction adjusting apparatus 1, a front-rear direction refers to a direction along a blowing direction of the air blown from wind direction adjusting apparatus 1 when horizontal louver 10 and a vertical louver, which will be described later, are held at a neutral central position. In this case, a downstream direction in which the air flows is indicated as a front, and an upstream direction is indicated as a rear. In addition, the neutral central position of horizontal louver 10 (or the vertical louver) refers to a position at which horizontal louver 10 (or the vertical louver) is held such that upper and lower surfaces of horizontal louver 10 (or left and right side surfaces of the vertical louver) are aligned in the front-rear direction.

An up-down direction and a left-right direction are a vertical direction (height direction) and a horizontal direction (width direction) when wind direction adjusting apparatus 1 is viewed from the air outlet side (for example, FIG. 1). In this case, the vertical direction and the horizontal direction are orthogonal to the front-rear direction, respectively, and the vertical direction and the horizontal direction are orthogonal to each other.

Wind direction adjusting apparatus 1 of the present embodiment includes a case body (not shown) in which the air flows, a plurality of horizontal louvers 10 disposed as first guide louvers at a front end portion of the case body, and a plurality of vertical louvers (not shown) disposed as second guide louvers at a position behind (upstream of) horizontal louvers 10. In this case, horizontal louver 10 and the vertical louver are sometimes called a front louver and a rear louver, respectively.

The case body is disposed on a rear surface side of instrument panel 5 and has a substantially rectangular tube shape. The case body has an air flow path formed along the front-rear direction to allow the air to flow toward the front. Three horizontal louvers 10 and five vertical louvers are rotatably attached to the case body. In addition, in the present invention, installation positions and installation numbers of horizontal louvers 10 and the vertical louvers are not particularly limited. For example, the vertical louver may be provided at a position in front (downstream) of horizontal louver 10.

Horizontal louvers 10 are disposed along the left-right direction when wind direction adjusting apparatus 1 is viewed from the air outlet side. In addition, when a cross section orthogonal to the up-down direction of wind direction adjusting apparatus 1 is viewed (see, for example, FIG. 4), horizontal louver 10 is disposed along a direction inclined with respect to the left-right direction so that one end portion (right end portion) of horizontal louver 10 in the left-right direction is disposed forward of the other end portion (left end portion). The vertical louvers (not shown) are arranged along the up-down direction when wind direction adjusting apparatus 1 is viewed from the air outlet side.

In wind direction adjusting apparatus 1 of the present embodiment, a flow of the air blown from wind direction adjusting apparatus 1 can be guided by the plurality of horizontal louvers 10 and the plurality of vertical louvers. For example, by rotating the plurality of horizontal louvers 10 up and down, the air blown from wind direction adjusting apparatus 1 can be directed upward or downward. In addition, by rotating the plurality of vertical louvers left and right, the air blown from wind direction adjusting apparatus 1 can be directed to the left or right.

Wind direction adjusting apparatus 1 of the present embodiment includes operation knob 20 operated when rotating horizontal louvers 10 and/or the vertical louvers, a horizontal link member (not shown) connecting the plurality of horizontal louvers 10, a pair of left and right first spacer members (not shown) that rotatably hold the plurality of horizontal louvers 10 and are attached to the case body; a vertical link member (not shown) connecting the plurality of vertical louvers, and a pair of left and right second spacer members (not shown) that rotatably hold the plurality of vertical louvers and are attached to the case body.

The plurality of horizontal louvers 10 are connected by the horizontal link member (not shown) so that a parallel positional relationship therebetween is held and rotational movements thereof are interlocked. The plurality of vertical louvers are connected by the vertical link member (not shown) so that a parallel positional relationship therebetween is held and rotational movements thereof are interlocked.

Since wind direction adjusting apparatus 1 of the present embodiment has a main feature in operation knob 20, the following mainly describes operation knob 20 and horizontal louvers 10 (first guide louver) to which operation knob 20 is attached. In addition, in the present invention, shapes, structures, materials, and the like of members other than operation knob 20 and horizontal louvers 10 forming wind direction adjusting apparatus 1 are not particularly limited.

Horizontal louvers 10 of the present embodiment are disposed along the left-right direction, and are held to rotate relative to the case body in the up-down direction. In the present embodiment, horizontal louvers 10 include upper horizontal louver (first horizontal louver) 10a, middle horizontal louver (second horizontal louver) 10b, and lower horizontal louver (third horizontal louver) 10*c*, which are spaced apart from each other in the up-down direction.

Upper horizontal louver 10*a* and lower horizontal louver 10*c* are respectively spaced apart from an upper wall portion and a lower wall portion of the case body in the up-down direction. Each horizontal louver 10 has horizontal louver body portion 11 having a thin plate shape, a pair of left and right rotating shaft portions 12 protruding outward in the left-right direction from left and right side end portions of horizontal louver body portion 11, and connecting pin 13 connected to the horizontal link member (not shown). FIGS. 2 and 3 show middle horizontal louver 10*b* as a representative.

In each horizontal louver 10, outer surfaces of a front end portion and a rear end portion of horizontal louver body portion 11 are formed as curved surfaces that curved in an arc shape to be swollen outward. An upper surface portion of horizontal louver body portion 11 has a first upper surface disposed at the front, a second upper surface disposed at the rear, and a stepped surface disposed between the first upper surface and the second upper surface, and the second upper surface is disposed at a higher position in the up-down direction than the first upper surface via the stepped surface.

In middle horizontal louver 10*b* of the present embodiment, attachment recessed portion 14 to which operation knob 20 is attached is provided in a portion of the front end portion of horizontal louver body portion 11 to be recessed rearward. In this case, attachment recessed portion 14 is disposed substantially in a central portion of horizontal louver body portion 11 in the left-right direction (width direction). Operation knob 20 is attached to middle horizontal louver 10*b* to be movable in the left-right direction within a formation range in which attachment recessed portion 14 is formed.

Operation knob 20 is attached to middle horizontal louver 10*b* to be slidable along a longitudinal direction of middle horizontal louver 10*b*. In this case, the longitudinal direction of middle horizontal louver 10*b* is inclined with respect to the left-right direction so that one end portion (right end portion) of middle horizontal louver 10*b* in the left-right direction is disposed forward of the other end portion (left end portion).

Operation knob 20 includes knob body portion 21 surrounding a portion of horizontal louver body portion 11, vertical louver engaging portion 22 formed integrally with knob body portion 21, and friction member 30 held in knob body portion 21. Friction member 30 is also called an elastic member or a sliding contact member.

In the present embodiment, knob body portion 21 has a substantially thin rectangular parallelepiped shape. Knob body portion 21 includes front component 24 formed to cover the upper surface portion, the front end portion, and a lower surface portion of horizontal louver body portion 11, rear component 25 that covers the rear end portion of horizontal louver body portion 11 and is assembled to front component 24, and decoration component 26 mounted on a front surface portion of front component 24, and is formed by combining these three components together. In this case, front component 24 of knob body portion 21 is provided with a front side engaging portion (or front side engaged portion) (not shown) engaged with rear component 25, and rear component 25 is provided with a rear side engaged portion (for rear side engaging portion) (not shown) engaged with front component 24.

An insertion hole through which horizontal louver body portion 11 of middle horizontal louver 10*b* is inserted is provided in knob body portion 21 of operation knob 20 to pass through knob body portion 21 from a right side surface portion to a left side surface portion of knob body portion 21. Holding portion 27 for holding friction member 30 is provided inside knob body portion 21 (see FIG. 4). Holding portion 27 is provided integrally with front component 24 of knob body portion 21, and is formed in a thin flat plate shape extending rearward.

Vertical louver engaging portion 22 of operation knob 20 is formed integrally with a rear cover component of knob body portion 21 and has a pair of left and right engaging arm portions 23 extending rearward from a rear end surface of the rear cover component. In this case, left and right engaging arm portions 23 are spaced apart from each other, and a space portion is provided between left and right engaging arm portions 23.

Vertical louver engaging portion 22 of operation knob 20 engages with one of the plurality of vertical louvers (not shown). In this case, the vertical louver engaged with vertical louver engaging portion 22 is provided with, for example, a vertical louver recessed portion (not shown) recessed rearward from the front end portion of the vertical louver, and engaging shaft portion 19 bridged across the vertical louver recessed portion in the up-down direction or substantially in the up-down direction.

Engaging shaft portion 19 provided in the vertical louver is inserted between left and right engaging arm portions 23 of operation knob 20. Since operation knob 20 is engaged with the vertical louver as described above, the vertical louver can be rotated left and right to change a direction of the vertical louver by sliding operation knob 20 left and right along middle horizontal louver 10*b*.

Friction member 30 of operation knob 20 is formed of an elastic soft synthetic resin such as elastomer. Friction member 30 is held in knob body portion 21 by holding portion 27 having a flat plate shape in knob body portion 21 in a state of being in contact with an outer peripheral surface of horizontal louver body portion 11 of middle horizontal louver 10*b*. Particularly in the present embodiment, friction member 30 is held in knob body portion 21 in a state in which friction member 30 comes into contact with the front end portion of horizontal louver body portion 11 and is pressed against the front end portion of horizontal louver body portion 11 so that a portion of a rear end portion of friction member 30 is compressed. As a result, a frictional force (static friction force and kinetic friction force) can be generated between friction member 30 and middle horizontal louver 10*b* when operation knob 20 is stopped or being operated.

As shown in FIG. 3, friction member 30 of the present embodiment includes attached portion 31 attached to knob body portion 21, and one protruding portion 32 protruding rearward (toward a side approaching middle horizontal louver 10*b*) from attached portion 31. Friction member 30 is formed so that entire friction member 30 has a constant thickness (thickness dimension in the up-down direction between an upper surface and a lower surface). In this case, friction member 30 is formed thicker than the front end portion of horizontal louver body portion 11.

Attached portion 31 of friction member 30 has a rectangular parallelepiped or substantially rectangular parallelepiped shape. Attached portion 31 is provided with insertion recessed portion 33 recessed rearward from a front surface of attached portion 31. Friction member 30 is held at a predetermined position of knob body portion 21 as holding portion 27 of knob body portion 21 is inserted and fitted into insertion recessed portion 33 of friction member 30.

Protruding portion 32 of friction member 30 is formed integrally with attached portion 31, and is formed as compression portion 34 including a portion that is pressed against and compressed by middle horizontal louver 10b when operation knob 20 is attached to middle horizontal louver 10b. In the case of the present embodiment, compression portion 34 of friction member 30 is formed by entire protruding portion 32.

At least a portion of protruding portion 32 of friction member 30 has a shape such that a dimension of protruding portion 32 along a sliding direction of operation knob 20 gradually decreases in a direction in which friction member 30 is pressed against middle horizontal louver 10b. For example, in the case of the present embodiment, protruding portion 32 (compression portion 34) of friction member 30 is formed in a triangular shape having a connecting portion connected to attached portion 31 as a base in a plan view of friction member 30 from above, and two sides extending from both end portions of the base away from attached portion 31 and forming an apex angle. Particularly in the case of the present embodiment, protruding portion 32 of friction member 30 has an isosceles triangular shape in the above-described plan view.

In this case, a tip end portion of protruding portion 32 (an end portion forming the apex angle of the triangle) has a pointed shape that gradually decreases in dimension along the sliding direction of operation knob 20 in a direction away from attached portion 31 (see FIGS. 3 and 4). Protruding portion 32 having an isosceles triangular shape is formed such that a width dimension of the base portion of protruding portion 32 is smaller than a width dimension of attached portion 31 of friction member 30. Therefore, attached portion 31 of friction member 30 has a rear end surface exposed rearward without being connected to protruding portion 32. In addition, the rear end surface of attached portion 31 is disposed to face the front end portion of horizontal louver body portion 11 when operation knob 20 is attached to middle horizontal louver 10b.

In the present embodiment, the sliding direction of operation knob 20 can be rephrased as the longitudinal direction of middle horizontal louver 10b. In addition, the direction in which friction member 30 is pressed against middle horizontal louver 10b and the direction of protruding portion 32 away from attached portion 31 mean the same direction.

Protruding portion 32 (compression portion 34) of friction member 30 is held in a state in which a portion of a tip end portion of protruding portion 32 is compressed by being pressed against middle horizontal louver 10b when operation knob 20 is attached to middle horizontal louver 10b. In this case, friction member 30 is formed such that a thickness of protruding portion 32 is thicker than a thickness of a front end side of horizontal louver body portion 11 as described above. Therefore, a central portion of protruding portion 32 in the up-down direction is compressed to be recessed by being pressed by middle horizontal louver 10b, and an upper end portion and a lower end portion of protruding portion 32 are disposed to overlap horizontal louver body portion 11 in the up-down direction (thickness direction of horizontal louver 10).

Here, in protruding portion 32 (compression portion 34) of friction member 30, portions of the upper end portion and the lower end portion of protruding portion 32 overlapping horizontal louver body portion 11 in the up-down direction in a state in which protruding portion 32 is pressed against middle horizontal louver 10b are defined as overlap portions (see FIG. 4). In addition, a size of the overlap portion of friction member 30 in the direction in which friction member 30 is pressed against middle horizontal louver 10b is defined as an overlap amount. In this case, protruding portion 32 (compression portion 34) of friction member 30 in the present embodiment includes the overlap portions provided to extend from the tip end portion of protruding portion 32 toward one side and the other side in the sliding direction with respect to the sliding direction of protruding portion 32, and non-overlap portions that are provided at both end portions (both end portions of the base of protruding portion 32) of protruding portion 32 in the sliding direction and do not overlap horizontal louver body portion 11 in the up-down direction.

In addition, in friction member 30 of the present embodiment, the overlap amount becomes the largest at the tip end portion where the apex angle of protruding portion 32 having a triangular shape is formed, and the overlap amount of protruding portion 32 gradually decreases in a direction away from the tip end portion of protruding portion 32 along the sliding direction. Furthermore, protruding portion 32 does not overlap horizontal louver body portion 11 in the up-down direction at both end portions of the base of protruding portion 32, and the overlap amount at both end portions of protruding portion 32 becomes zero.

Moreover, in the present embodiment, attached portion 31 of friction member 30 is disposed slightly away from horizontal louver body portion 11 so as not to come into contact with horizontal louver body portion 11, so that a gap is provided between attached portion 31 and horizontal louver body portion 11.

In a case of attaching operation knob 20 of the present embodiment to middle horizontal louver 10b, first, friction member 30 is attached to front component 24 of knob body portion 21. At this time, friction member 30 is held and attached to front component 24 by inserting and fitting flat plate-shaped holding portion 27 provided on front component 24 into insertion recessed portion 33 of friction member 30.

Subsequently, horizontal louver body portion 11 of middle horizontal louver 10b is inserted into the insertion hole of front component 24 holding friction member 30. Furthermore, rear component 25 of knob body portion 21 is engaged with and attached to a rear end portion of front component 24 into which middle horizontal louver 10b is inserted. In addition, decoration component 26 is attached to front component 24 of knob body portion 21. A time at which decoration component 26 is attached to front component 24 is not particularly limited.

Accordingly, middle horizontal louver 10b to which operation knob 20 is attached as shown in FIG. 2 is produced. Further, by attaching middle horizontal louver 10b with operation knob 20 thus obtained to the case body, wind direction adjusting apparatus 1 of the present embodiment is manufactured.

According to wind direction adjusting apparatus 1 of the present embodiment including middle horizontal louver 10b to which operation knob 20 is attached, as friction member 30 of operation knob 20 is pressed against the front end portion of the horizontal louver body portion 11 of middle horizontal louver 10b, a frictional force is generated between friction member 30 and middle horizontal louver 10b. In addition, protruding portion 32 of friction member 30 that comes into contact with horizontal louver body portion 11 has a triangular shape and is formed as compression portion 34 that is compressed by being pressed against horizontal louver body portion 11.

Accordingly, when operation knob 20 is stopped, friction member 30 comes into contact with middle horizontal louver 10b in a compressed state, thereby generating a static friction force with middle horizontal louver 10b. Accordingly, operation knob 20 can be stably held at the stop position. In addition, it is possible to prevent rattling of operation knob 20 attached to middle horizontal louver 10b.

On the other hand, in a case where a user applies force (operating force) to operation knob 20 in the sliding direction to slide operation knob 20 along middle horizontal louver 10b from the stopped state, the frictional force between friction member 30 and middle horizontal louver 10b switches from the static friction force to a kinetic friction force. At this time, since protruding portion 32 (compression portion 34) of friction member 30 is formed in a triangular shape, a magnitude of the force (load) applied to friction member 30 from middle horizontal louver 10b can be changed in the sliding direction of operation knob 20.

That is, in the sliding direction of operation knob 20, a load received from middle horizontal louver 10b becomes the largest at the portion where the apex angle of triangular friction member 30 is formed (the portion where the overlap amount of friction member 30 is the largest). As a result, a maximum static friction force generated between friction member 30 and middle horizontal louver 10b is maximized.

In addition, in friction member 30, the load received from middle horizontal louver 10b can be gradually reduced (the overlap amount of friction member 30 can be gradually reduced) in a direction away from the portion of the apex angle of the triangle along the sliding direction. Furthermore, both end portions of the base of friction member 30 do not receive the load from middle horizontal louver 10b. That is, in the present embodiment, a magnitude of the maximum static friction force generated between triangular protruding portion 32 (compression portion 34) of friction member 30 and middle horizontal louver 10b can be changed in the sliding direction.

In this case, when operation knob 20 is slid along middle horizontal louver 10b from the stopped state, the time at which the frictional force switches from the static friction force to the kinetic friction force within protruding portion 32 of friction member 30 can be changed according to the magnitude of the overlap amount of protruding portion 32 along the sliding direction. As a result, operation knob 20 can be smoothly and easily slid on middle horizontal louver 10b, so that a stick-slip phenomenon can be prevented or suppressed.

In particular, in the present embodiment, protruding portion 32 of friction member 30 is formed in a triangular shape with a sharp tip end, and both end portions of the base of protruding portion 32 are formed as the non-overlap portions that do not overlap horizontal louver body portion 11 in the up-down direction. Therefore, in a case where operation knob 20 slides, the maximum static friction force generated between horizontal louver body portion 11 and friction member 30 can be smoothly changed in the sliding direction.

As a result, the stick-slip phenomenon can be more effectively prevented or suppressed. Accordingly, operation knob 20 can be slid more smoothly along horizontal louver 10, so that an operation feeling and operability of operation knob 20 at the start of sliding can be improved. Furthermore, in the present embodiment, even if friction member 30 comes in close contact with horizontal louver body portion 11, since protruding portion 32 of friction member 30 is formed in a triangular shape, operation knob 20 can be smoothly moved with a relatively light force.

In addition, when operation knob 20 is subjected to a sliding operation, a kinetic friction force can be generated between friction member 30 and middle horizontal louver 10b. Therefore, the user can accurately perform the sliding operation of operation knob 20, and can stably obtain an appropriate operation feeling of operation knob 20. Thereafter, when operation knob 20 is stopped, by the static friction force between friction member 30 and middle horizontal louver 10b, operation knob 20 can be stably held at the stop position.

It should be noted that the present invention is not limited to the above-described embodiments, and various modifications are possible as long as substantially the same configuration as the present invention is provided and the same actions and effects are exhibited. For example, an overall shape, a design, a size, and the like of the wind direction adjusting apparatus are not particularly limited, and can be changed according to an installation position of the apparatus, a type and design of the vehicle in which the apparatus is installed, and the like.

In the case of the above-described embodiment, compression portion 34 (protruding portion 32) of friction member 30 is formed in the shape of one isosceles triangle in a plan view of friction member 30 from above. However, in the present invention, the shape of the compression portion (protruding portion) of the friction member is not limited thereto. The number of compression portions installed in the friction member, the shape of the compression portion, and the like can be changed as long as the compression portion of the friction member has a shape in which a dimension of the compression portion along the sliding direction gradually decreases in the pressing direction against the horizontal louver (guide louver).

Figure 5:
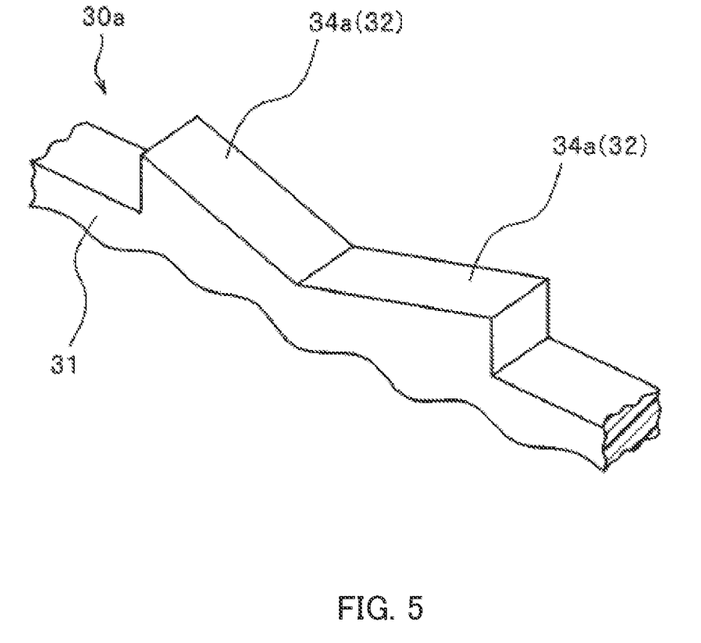
FIG. 5 is a perspective view schematically showing a main part of a friction member according to a modification example disposed in the wind direction adjusting apparatus.
Figure 6:
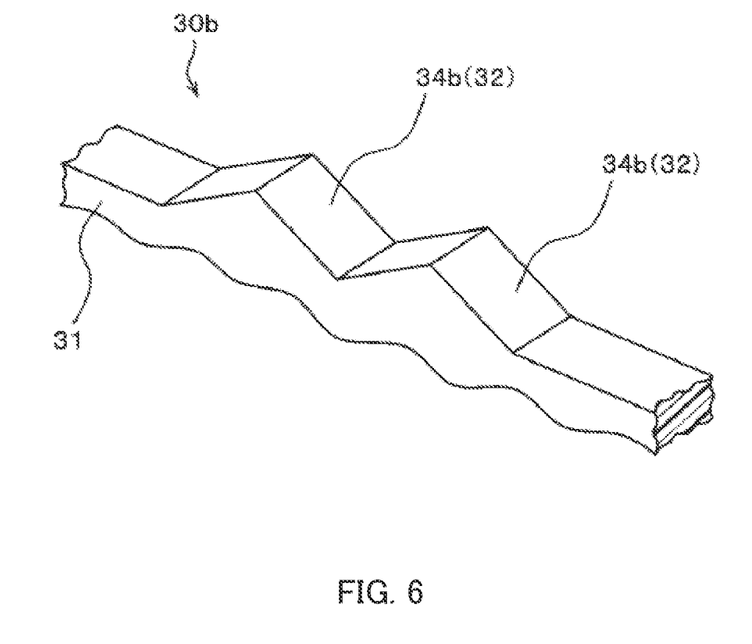
FIG. 6 is a perspective view schematically showing a main part of a friction member according to another modification example disposed in the wind direction adjusting apparatus.

For example, as respectively shown in FIGS. 5 and 6 showing main parts of friction members 30a and 30b according to modification examples, two or more compression portions 34a and 34b may be provided in friction members 30a and 30b. In addition, the compression portion may be formed in a shape of a triangle other than an isosceles triangle, such as a right triangle, or in a shape other than a triangle. For example, as specific shapes other than the triangle, the compression portion of the friction member may adopt a shape such as a semicircular shape, a semielliptical shape, or a trapezoidal shape in a plan view. Even in a case where the compression portion of the friction member is formed in a triangular shape as shown in FIGS. 5 and 6, or in a shape other than a triangle, such as a semicircle, the stick-slip phenomenon can be prevented or suppressed when the operation knob is slid.

Furthermore, in the above-described embodiment, compression portion 34 of friction member 30 is formed over entire protruding portion 32. However, in the present invention, the compression portion of the friction member may be formed only in a portion of the protruding portion depending on the shape, size, and the like of the operation knob. For example, the protruding portion of the friction member may include an attached portion attached to the knob body portion, a first protruding portion protruding from the attached portion in a rectangular parallelepiped shape, and a second protruding portion protruding from the first protruding portion in a triangular shape. In this case, the compression portion of the friction member may be provided only in the second protruding portion having a triangular shape.

In addition, in wind direction adjusting apparatus 1 of the embodiment described above, horizontal louver 10 is disposed in front of the vertical louver, and operation knob 20 for operating the rotation of the vertical louver is attached to middle horizontal louver 10b. However, in the present invention, the wind direction adjusting apparatus may have a structure in which, for example, the vertical louver is disposed in front of the horizontal louver, and the operation knob for operating the rotation of the horizontal louver is attached to the vertical louver in front to be slidable along the up-down direction.

REFERENCE SIGNS LIST

1 Wind direction adjusting apparatus
5 Instrument panel
10 Horizontal louver
10a Upper horizontal louver (First horizontal louver)
10b Middle horizontal louver (Second horizontal louver)
10c Lower horizontal louver (Third horizontal louver)
11 Horizontal louver body portion
12 Rotating shaft portion
13 Connecting pin
14 Attachment recessed portion
19 Engaging shaft portion
20 Operation knob
21 Knob body portion
22 Vertical louver engaging portion
23 Engaging arm portions
24 Front component
25 Rear component
26 Decoration component
27 Holding portion
30 Friction member
30a,30b Friction member
31 Attached portion
32 Protruding portion
33 Insertion recessed portion
34 Compression portion
34a,34b Compression portion

What is claimed is:

1. A wind direction adjusting apparatus comprising:
a case body in which air flows;
at least one guide louver that is provided in the case body and guides a flow of the air; and
an operation knob slidably attached to the at least one guide louver,
wherein the operation knob includes
a knob body portion provided with an insertion portion through which the at least one guide louver is inserted, and
a friction member that is held in the knob body portion in a state of being in contact with an outer peripheral surface of the at least one guide louver to generate a frictional force with the at least one guide louver,
the friction member has elasticity and has at least one compression portion including a portion that is compressed by being pressed against the at east one guide louver, and
the compression portion has a shape in which a dimension of the compression portion along a sliding direction of the operation knob gradually decreases in a pressing direction against the at least one guide louver.

2. The wind direction adjusting apparatus according to claim 1,
wherein a tip end portion of the compression portion in the pressing direction against the at least one guide louver has a pointed shape that gradually decreases in dimension along the sliding direction.

3. The wind direction adjusting apparatus according to claim 2,
wherein the friction member has an attached portion attached to the knob body portion and at least one protruding portion protruding from the attached portion toward the at least one guide louver, and
the compression portion is provided in the at least one protruding portion.

4. The wind direction adjusting apparatus according to claim 2,
wherein the compression portion has, in the sliding direction, an overlap portion that overlaps the at least one guide louver in a thickness direction of the at least one guide louver and a non-overlap portion that does not overlap the at east one guide louver in the thickness direction of the at least one guide louver.

5. The wind direction adjusting apparatus according to claim 1,
wherein the friction member has an attached portion attached to the knob body portion and at least one protruding portion protruding from the attached portion toward the at least one guide louver, and
the compression portion is provided in the at least one protruding portion.

6. The wind direction adjusting apparatus according to claim 5,
wherein the compression portion has, in the sliding direction, an overlap portion that overlaps the at least one guide louver in a thickness direction of the at least one guide louver and a non-overlap portion that does not overlap the at east one guide louver in the thickness direction of the at least one guide louver.

7. The wind direction adjusting apparatus according to claim 1,
wherein the compression portion has, in the sliding direction, an overlap portion that overlaps the at least one guide louver in a thickness direction of the at least one guide louver and a non-overlap portion that does not overlap the at least one guide louver in the thickness direction of the at least one guide louver.

* * * * *